No. 650,055. Patented May 22, 1900.
I. S. SMITH.
COFFEE POT.
(Application filed Aug. 15, 1899.)
(No Model.)
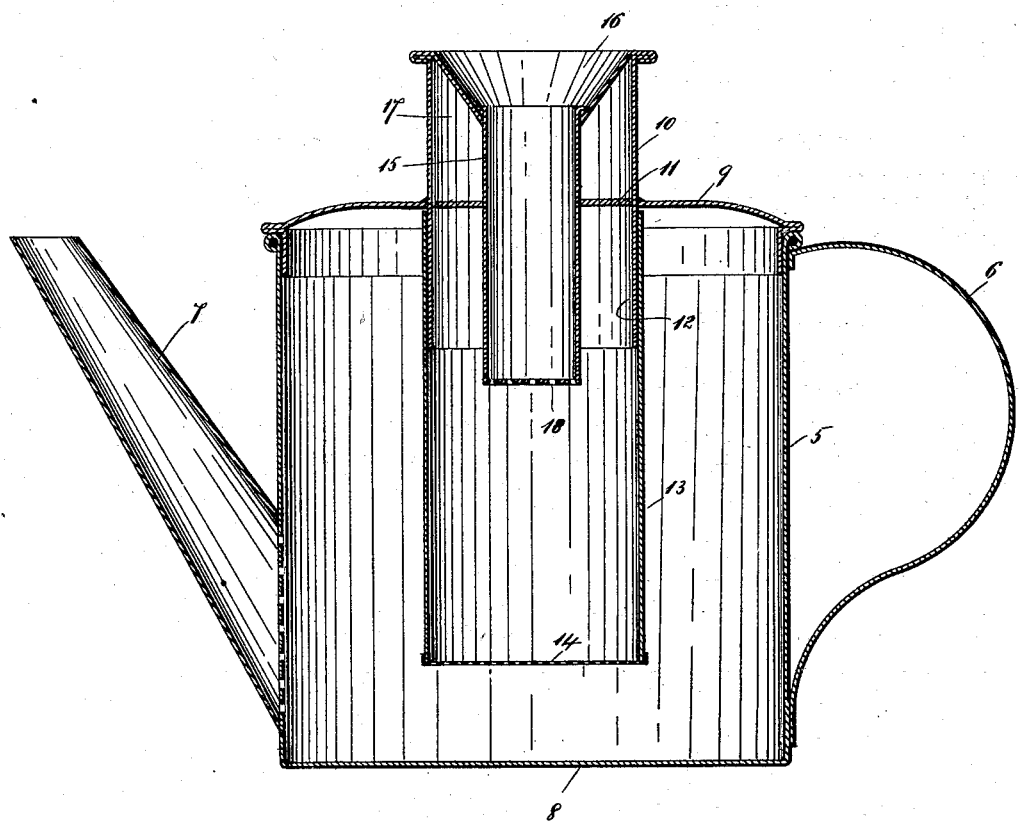

UNITED STATES PATENT OFFICE.

ISAAC S. SMITH, OF PUEBLO, COLORADO.

COFFEE-POT.

SPECIFICATION forming part of Letters Patent No. 650,055, dated May 22, 1900.

Application filed August 15, 1899. Serial No. 727,263. (No model.)

*To all whom it may concern:*

Be it known that I, ISAAC S. SMITH, a citizen of the United States, residing at Pueblo, in the county of Pueblo and State of Colorado, have invented certain new and useful Improvements in Coffee-Pots, of which the following is a full and complete specification, such as will enable those skilled in the art to which it appertains to make and use the same.

This invention relates to coffee-pots; and the object thereof is to provide an improved device of this class which is simple in construction and operation and by means of which a clear and pure coffee may be quickly and easily made.

The invention is fully disclosed in the following specification, of which the accompanying drawing forms a part, said drawing being a central vertical section of my improved coffee-pot.

In the drawing forming part of this specification the separate parts of my improvement are designated by numerals of reference, and in the practice of my invention I provide a coffee-pot comprising a vessel 5 of the usual form, provided with a handle 6 and opposite the handle 6 with a spout 7. The vessel 5 is provided with a closed bottom 8 and a detachable cover 9, and secured in the cover centrally thereof is a tubular casing 10, provided with a central transverse partition 11. The tubular casing 10 projects below the cover 9 to form a collar 12, or said tubular casing and said collar may be formed separate and be secured to the cover 9. The lower end of the collar 12 is open, and I also provide a tubular receptacle 13, which is adapted to be slipped onto the collar 12 and to be held thereon by friction and to be adjusted vertically thereon. The tubular receptacle 13 is provided with a perforated bottom 14, and fixed centrally in the tubular casing 10 and the collar 12 and passing through the partition-plate 11 is a tube 15, the upper end of which is connected with the upper end of the tubular casing 10 by a conical-shaped part 16, which closes the upper end of an annular chamber 17 between the tubular casing 10 and the tube 15. The tube 15 is also provided with a perforated bottom 18, and the separate parts hereinbefore described may be formed and connected in any desired manner.

The operation will be readily understood from the foregoing description when taken in connection with the accompanying drawing and the following statement thereof.

The chamber 17 constitutes a cold-air chamber and condenser, and in practice the coffee is placed in the receptacle 13, and hot water is poured into the tube 15 and passes or percolates through the coffee into the receptacle 5, which constitutes the main portion of the coffee-pot. This operation separates the coffee from the grounds, and in the operation of the device, as described, the steam rises and settles on the bottom 18 of the tube 15 and closes the perforations therein, thus forming a water-cap and sealing said tube, while the air in the chamber 17 aids to condense the steam, and the aroma of the coffee is retained in the receptacle 5.

It will be apparent that this device may be used for making tea, as well as coffee, and my invention is therefore not limited in use to making coffee, as hereinbefore described.

Having fully described my invention, I claim as new and desire to secure by Letters Patent—

A coffee-pot, comprising a receptacle having a removable cover and provided at one side with a discharge-spout, a tubular casing connected with said cover and provided with a transverse partition, said tubular casing projecting below said cover to form a collar, a tubular receptacle which is passed upon the lower end of said collar, and provided with a perforated bottom, and a tube 15 which is passed through said transverse partition and the upper end of which is connected with the upper end of said tubular casing by means of a conical-shaped portion, whereby an annular closed chamber is formed between said tube 15 and said tubular casing and above said transverse partition, substantially as shown and described.

In testimony that I claim the foregoing as my invention I have signed my name, in presence of the subscribing witnesses, this 8th day of August, 1899.

ISAAC S. SMITH.

Witnesses:
G. W. McGOVERN,
CHARLES F. WILSON.